(12) United States Patent
Kini et al.

(10) Patent No.: US 10,114,376 B2
(45) Date of Patent: Oct. 30, 2018

(54) SYSTEM AND METHOD FOR CONTROLLING EDGE DUMPING OF MOBILE MACHINES

(71) Applicant: Caterpillar Inc., Peoria, IL (US)

(72) Inventors: Ananth P Kini, Dunlap, IL (US); Matthew Johnson, Dunlap, IL (US); Joshua Struble, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 133 days.

(21) Appl. No.: 15/246,582

(22) Filed: Aug. 25, 2016

(65) Prior Publication Data

US 2018/0059668 A1   Mar. 1, 2018

(51) Int. Cl.
| | |
|---|---|
| *G05D 1/02* | (2006.01) |
| *E02F 9/20* | (2006.01) |
| *B60W 30/04* | (2006.01) |

(52) U.S. Cl.
CPC ........... *G05D 1/0214* (2013.01); *B60W 30/04* (2013.01); *E02F 9/205* (2013.01); *E02F 9/2045* (2013.01); *B60W 2300/125* (2013.01)

(58) Field of Classification Search
CPC .............. G05D 1/0214; G05D 1/024; G05D 2201/021; B60W 30/04; B60W 2300/125; E02F 9/205; E02F 9/2045; E02F 9/2033; E02F 9/265; E02F 9/261; B60P 1/283; B60P 1/04; G01C 21/30; G01S 13/04; G01S 13/74; G01S 13/865; G01S 13/88; G01S 15/88; G01S 17/06; G01S 17/42; G01S 17/87; G01S 17/88; G01S 17/89
See application file for complete search history.

(56) References Cited

U.S. PATENT DOCUMENTS

| | | | |
|---|---|---|---|
| 3,727,332 A | * 4/1973 | Zimmer | E02F 3/18 172/4.5 |
| 6,539,294 B1 | 3/2003 | Kageyama | |
| 8,880,334 B2 | 11/2014 | Kini et al. | |
| 8,965,641 B2 | 2/2015 | Smith et al. | |
| 9,008,886 B2 | 4/2015 | Braunstein et al. | |
| 9,097,520 B2 | * 8/2015 | Stratton | G01C 7/04 |
| 9,145,661 B1 | 9/2015 | Jensen | |
| 9,244,464 B2 | 1/2016 | Kini et al. | |
| 9,298,188 B2 | 3/2016 | Kini et al. | |
| 2010/0076640 A1 | * 3/2010 | Maekawa | G05D 1/0217 701/26 |

(Continued)

*Primary Examiner* — Abby Y Lin (74) *Attorney, Agent, or Firm* — Harrity & Harrity LLP (57) ABSTRACT

A control system for a machine traveling on a work surface is provided. The control system includes a perception system generating data indicative of a contour of the work surface. The control system includes a controller communicably coupled to the perception system. The controller receives a signal indicative of a current position of the machine on the work surface as the machine travels along a first direction. The controller initiates a scanning of the work surface by the perception system. The controller receives the signal indicative of the contour of the work surface from the perception system and identifies a raised contour and a contour edge within a target area on the work surface. The controller determines a location of the contour edge within the target area based on the identification and controls a positioning of the machine within the target area and relative to the raised contour.

20 Claims, 7 Drawing Sheets

(56) References Cited

U.S. PATENT DOCUMENTS

2010/0275472 A1* 11/2010 Cunningham ........ B60P 1/5438
 37/403
2014/0214236 A1* 7/2014 Kini .................... G05D 1/0297
 701/2
2015/0206433 A1 7/2015 Kanai et al.

* cited by examiner

SYSTEM AND METHOD FOR CONTROLLING EDGE DUMPING OF MOBILE MACHINES

TECHNICAL FIELD

The present disclosure relates generally to a control system for a machine, and more particularly, to a system and method for controlling edge dumping of mobile machines.

BACKGROUND

Mobile machines, such as hauling machines, are often used to haul material from a load location, at which material is loaded into the machines, to a dump location, at which the material is dumped or discharged from the hauling machines. When operating near a crest or high wall, raised contours such as one or more berms are often formed adjacent to the high wall to act as a guide for assisting in positioning of the hauling machines relative to the high wall to perform a dumping operation. More specifically, the berms may include a sloped wall that is engaged by tires of the hauling machines to appropriately position the hauling machine for the dumping operation.

For efficient worksite management, the hauling machine should dump the material at a specified location. Therefore, exact positions of the berms and associated dump edges should be known to the hauling machine so as to perform the dumping operation effectively. Conventional methods make use of an onboard sensor to determine whether the tires of the hauling machine have engaged the berm and subsequently stop the hauling machine upon engagement by the tires of the berm. However, such systems may need initial and/or continuous contact with the berm for relative positioning of the hauling machine. Since topographic characteristics, such as height, of the berm may change with such contact, these systems may not be as accurate as desired.

U.S. Published Application Number 2015/0206433 describes a vehicle control system. The vehicle control system includes a Global Positioning System (GPS) receiver for detecting position of each vehicle, an encoder and an Inertial Measurement Unit (IMU) mounted on a vehicle. The vehicle control system operates such that if a position requiring caution is found, the information is fed back to the system associated with the vehicle. For example, the vehicle control system gives feedback to the respective vehicle if the vehicle makes contact with a berm on a track road based on received sensory data. Accordingly, the vehicle control system may assist in avoiding collision with the berm.

However, the system described may be inefficient in positioning the rear tires of the hauling machine relative to the berm on the rear side of the hauling machine. Hence, an improved system for positioning the machine is required.

SUMMARY OF THE DISCLOSURE

In an aspect of the present disclosure, a control system for a machine traveling on a work surface is provided. The work surface includes a target area having a raised contour and a contour edge. The control system includes a perception system mounted on the machine. The perception system generates data indicative of a contour of the work surface. The control system further includes a controller communicably coupled to the perception system. The controller receives a signal indicative of a current position of the machine on the work surface as the machine travels along a first direction. The controller initiates a scanning of the work surface along the first direction by the perception system when the machine is at a predetermined distance from the target area. The controller receives the signal indicative of the contour of the work surface from the perception system. The controller identifies the raised contour and the contour edge within the target area based on the received data indicative of the contour as the machine approaches the target area while traveling along a second direction. The second direction is different from the first direction. The controller determines a location of the contour edge within the target area based on the identification. Further, the controller controls a positioning of the machine within the target area and relative to the raised contour such that tires of the machine coincide with the contour edge of the raised contour.

In another aspect of the present disclosure, a method of controlling a machine travelling on a work surface is provided. The work surface includes a target area having a raised contour and a contour edge. The method includes receiving a signal indicative of a current position of the machine on the work surface through a position detection system as the machine travels along a first direction. The method includes initiating a scanning of the work surface along the first direction by a perception system when the machine is at a predetermined distance from the target area. The method includes receiving data indicative of a contour of the work surface through the perception system. The method includes identifying the raised contour and the contour edge within the target area based on the received data indicative of the contour by a controller as the machine approaches the target area while traveling along a second direction. The second direction is different from the first direction. The method includes determining a location of the contour edge within the target area based on the identification by the controller. The method further includes controlling a positioning of the machine within the target area and relative to the raised contour such that tires of the machine coincide with the contour edge of the raised contour.

In yet another aspect of the present disclosure, a control system for a machine traveling on a work surface is provided. The work surface includes a target area having a raised contour and a contour edge. The control system includes a LIDAR system mounted on the machine. The LIDAR system generates a signal indicative of a contour of the work surface. The control system includes a controller communicably coupled to the LIDAR system. The controller receives a signal indicative of a current position of the machine on the work surface as the machine travels along a first direction. The controller initiates a scanning of the work surface along the first direction by the LIDAR system when the machine is at a predetermined distance from the target area. The controller receives data indicative of the contour of the work surface from the LIDAR system. The controller identifies the raised contour and the contour edge within the target area based on the received data indicative of the contour as the machine approaches the target area while traveling along a second direction. The second direction is different from the first direction. The controller determines a location of the contour edge within the target area based on the identification. The controller controls a positioning of the machine within the target area and relative to the raised contour. Further, the controller halts the machine within the target area such that tires of the machine are engaged with the raised contour and contact points of the respective tires coincide with the contour edge of the raised contour.

DETAILED DESCRIPTION

Figure 1:
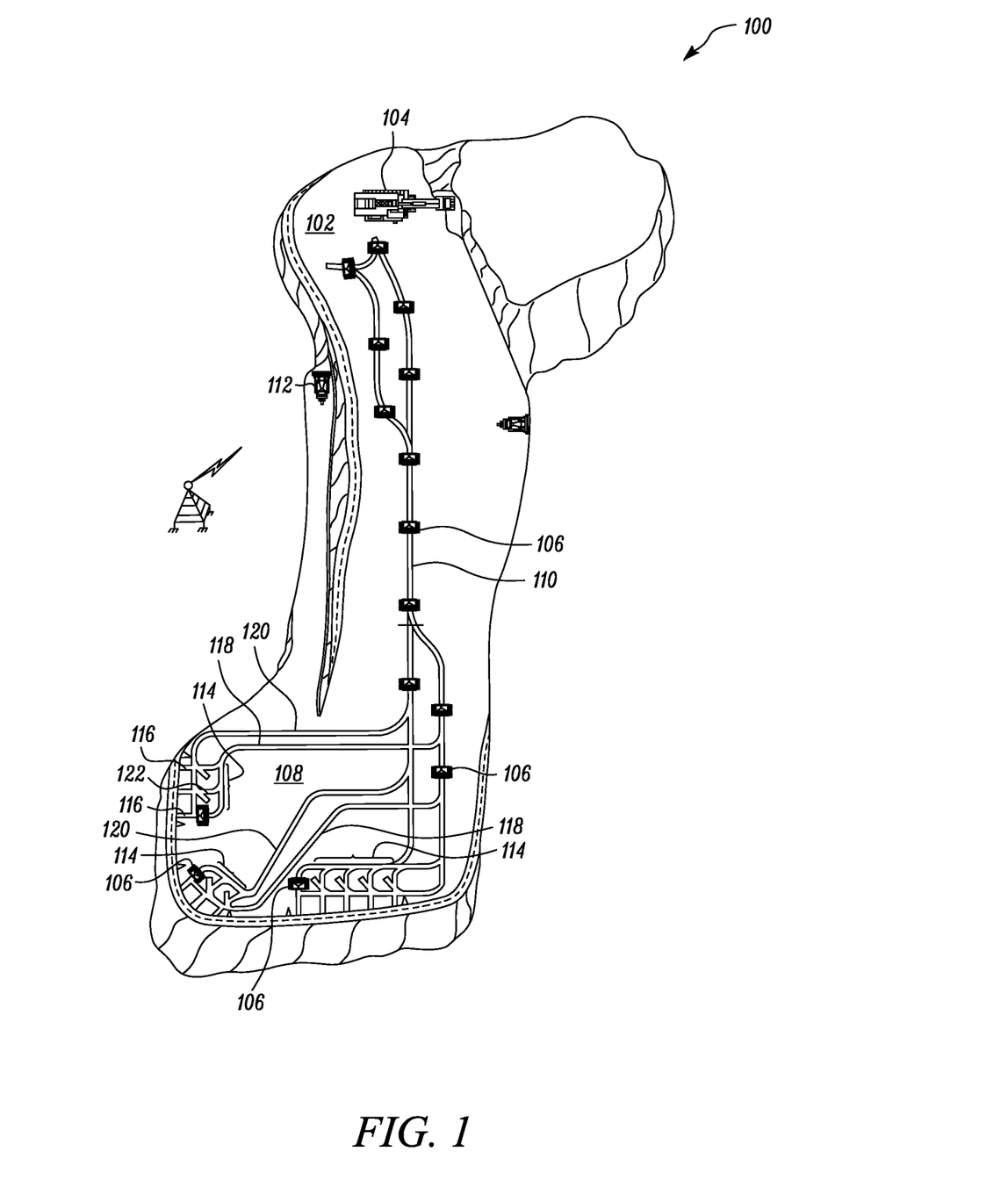
FIG. 1 is a schematic representation of an exemplary work surface, according to an aspect of the present disclosure.

Wherever possible, the same reference numbers will be used throughout the drawings to refer to same or like parts. FIG. 1 illustrates an exemplary work surface 100 having multiple, simultaneously-operable machines performing a variety of predetermined tasks. The work surface 100 may include, for example, a mine site, a landfill, a quarry, a construction site, or any other type of work surface known in the art. The predetermined tasks may be associated with altering the current geography at the work surface 100 and include a clearing operation, a leveling operation, a hauling operation, a digging operation, a loading operation, a dumping operation, or any other type of operation that functions to alter the current geography at the work surface 100.

The work surface 100 may include multiple locations designated for particular purposes. For example, the work surface 100 may include a load location 102, at which a mobile loading machine 104 or other resource operates to fill multiple mobile hauling machines 106 with material. The work surface 100 may also include a dump location 108, at which the hauling machines 106 discharge their payloads. In the disclosed embodiment, the dump location 108 is positioned at an edge of a steep incline or cliff area known as a "high-wall". In this embodiment, the hauling machines 106 may be tasked with discharging their payloads over the edge or crest of the high-wall. Accordingly, the work surface 100 may be a considered a "high-wall operation".

The hauling machines 106 may follow a main travel path 110 that generally extends between the load location 102 and the dump locations 108. One or more additional mobile dozing, grading, or other clean-up machines 112 at the work surface 100 may be tasked with clearing or leveling the load location 102, the dump location 108, and/or the main travel path 110 such that travel by the hauling machines 106 at these locations may be possible. As the hauling machines 106 operate at the work surface 100, the shapes, dimensions, and general positions of the load location 102, the dump location 108, and the main travel path 110 may change. The hauling machines 106 may be self-directed machines configured to autonomously traverse the changing terrain of the work surface 100, manned machines configured to traverse the work surface 100 under the control of an operator, or hybrid machines configured to perform some functions autonomously and other functions under the control of the operator.

The dump location 108 is divided into groupings 114 of dump targets 116 at which the hauling machines 106 should discharge their loads. Each grouping 114 is assigned a dedicated entrance path 118 and a dedicated exit path 120 that connect at first ends with the main travel path 110, and individual travel lanes 122 that extend between each dump target 116 and opposing second ends of the corresponding entrance path 118 and the exit path 120. It is contemplated that the dump location 108 may have any number of the groupings 114. By having the multiple groupings 114 at the dump location 108, more than one hauling machine 106 may be operational at the dump location 108 at the same time without causing traffic problems and significant time delays along the entrance path 118 and the exit path 120.

Figure 2:
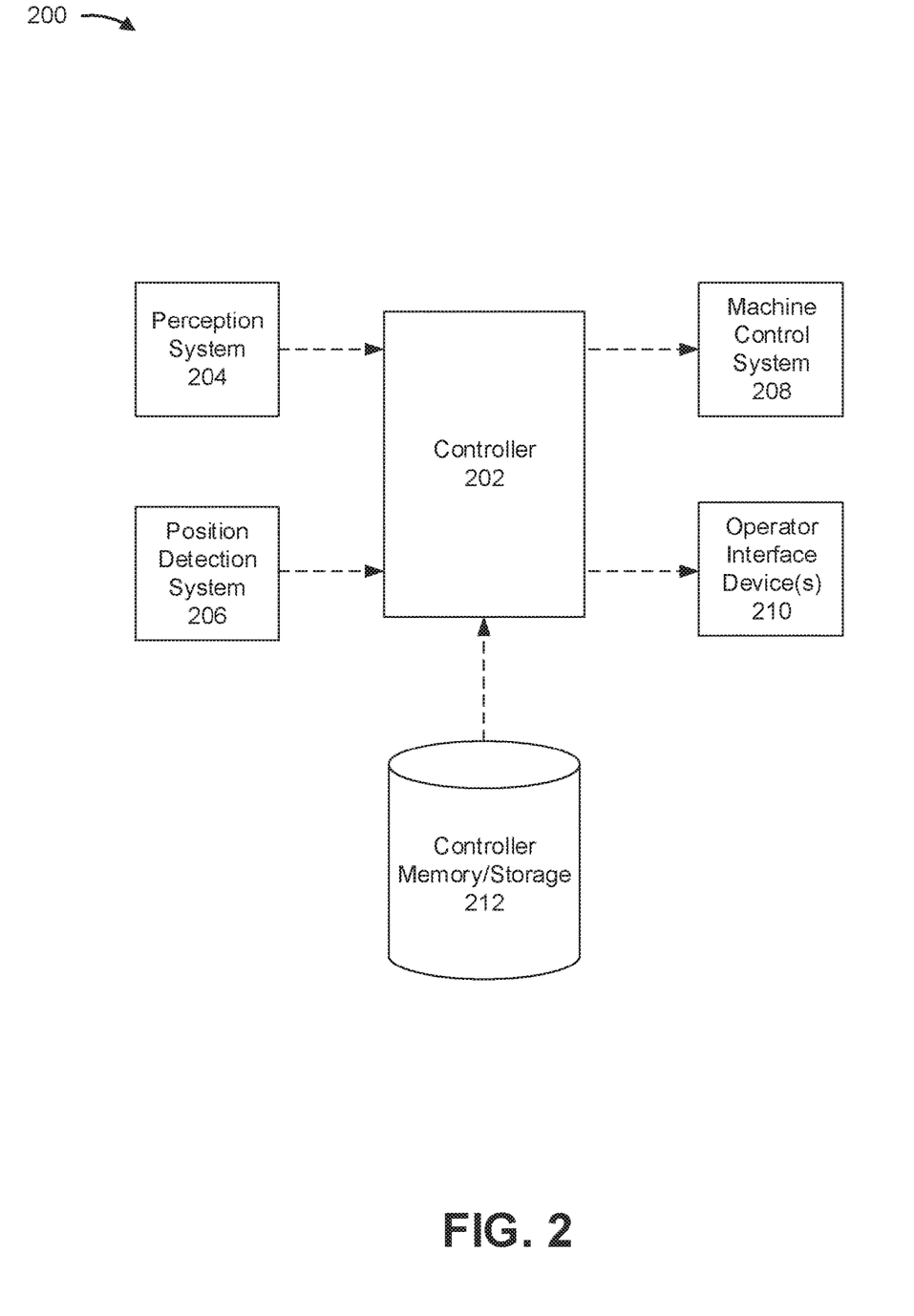
FIG. 2 is a block diagram of a control system for a machine, according to an aspect of the present disclosure.

Referring to FIG. 2, a control system 200 is associated with the hauling machine 106 to control various functions of the hauling machine 106. The control system 200 includes a controller 202, a perception system 204, a position detection system 206, a machine control system 208, and one or more of operator interface devices 210. The controller 202 is communicably coupled to the perception system 204, the position detection system 206, the machine control system 208, and the operator interface devices 210. The controller 202 receives input signals corresponding to various operational parameters related to the hauling machines 106 operating on the work surface 100.

The controller 202 processes the input signals and provides output signals as well as instructions to control the hauling machine 106 through the machine control system 208 and the operator interface devices 210. When intended for use with a manually operated hauling machine, the operator interface devices 210 may include, for example, an input device such as a joystick, keyboard, steering wheel, pedal, lever, button, switch, etc. Alternatively or additionally, the operator interface devices 210 may include a display device, such as a monitor.

The perception system 204 generates data indicative of a contour of the work surface 100. The data generated by the perception system 204 may provide various types of information about the contour of the work surface 100, for example, location of a crest, location of a trough, location of a flat surface, etc. The data generated by the perception system 204 may provide information about positions of various machines at the work surface 100. The perception system 204 may generate data corresponding to whole area of the work surface 100. In one embodiment, the perception system 204 generates data corresponding only to a part of the work surface 100.

The data generated by the perception system 204 may be provided in various forms. For example, the perception system 204 may generate a three-dimensional map of the work surface 100 indicating types of contour corresponding to various locations on the work surface 100. The perception system 204 may also generate a two-dimensional map of the work surface 100 showing variation of contour over the work surface 100. In such a two-dimensional map, every point may be mapped to a specific location on the work surface 100 making it feasible to extract location specific contour information from the two-dimensional map. Various other alternatives of providing the data generated by the perception system 204 may be possible without limiting the scope of the present disclosure.

The perception system 204 may be any one of a SONAR system, a RADAR system, or an image capturing sensor etc. The perception system 204 may be any other type of system as well which may be able to generate the data indicating the contour of the work surface 100. The perception system 204 transmits signals corresponding to the data generated indicative of the contour of the work surface 100 to the controller 202 for further processing. For further description of the perception system 204, the perception system 204 is embodied as a Light Detection And Ranging (LIDAR) system.

The LIDAR system may include a laser sensor, a Global Positioning System (GPS), and an Inertial Measurement Unit (IMU). The LIDAR system may send pulses of laser light towards an area to be mapped on the work surface 100 through the laser sensor. The laser light collides with various points on the work surface 100 and reflects back towards the LIDAR system. The LIDAR system calculates height/depth of each point by recording time taken for each laser pulse to return from respective points. Location of each point relative to the LIDAR system may be provided by the GPS and the orientation of the LIDAR system may be taken into account via the IMU. Thus, the LIDAR system generates the data indicative of the contour of the work surface 100. The LIDAR system may transmit signals corresponding to the data generated indicative of the contour of the work surface 100 to the controller 202.

The control system 200 further includes the position detection system 206. The position detection system 206 may be configured to determine a position of the hauling machine 106 at the work surface 100 and generate a signal indicative of the position of the hauling machine 106. The position detection system 206 could embody, for example, a Global Positioning System (GPS) device, an Inertial Reference Unit (IRU), a local tracking system, or any other known locating device that receives or determines positional information associated with the hauling machine 106. The position detection system 206 is configured to convey a signal indicative of the received or determined positional information to the controller 202 for processing.

It is contemplated that the location signal may also be directed to the one or more operator interface devices 210 (e.g., to the monitor) for display of location of the hauling machine 106 in an electronic representation of the work surface 100, if desired. In one embodiment, the position detection system 206 may share location information of the hauling machine 106 on which the position detection system 206 is installed with the other hauling machines 106 on the work surface 100.

The controller 202 receives signals indicative of the contour of the work surface 100 from the perception system 204 and the signals indicative of the location of the hauling machine 106 from the position detection system 206. The controller 202 may embody a single or multiple microprocessors, field programmable gate arrays (FPGAs), digital signal processors (DSPs), etc., that include a means for controlling operations of the hauling machines 106 in response to operator requests, built-in constraints, sensed operational parameters, and/or communicated instructions from an off-board controller (not shown). Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The controller 202 may also include a communicating device. The communicating device may include hardware and/or software that enable sending and receiving of data messages between the controller 202 and the off-board controller. The data messages associated with the controller 202 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communicating device to exchange information between the controller 202 and various components of the control system 200.

The controller 202 further includes an associated controller memory/storage 212. It should be understood that the controller memory 212 may be any one of a computer program product or computer-readable media such as computer chips and secondary storage devices, including hard disks, floppy disks, optical media, CD-ROM, or other forms of RAM or ROM. The off-board controller may include any means for monitoring, recording, storing, indexing, processing, and/or communicating various operational aspects of the work surface 100 and the hauling machines 106.

After receiving the signals from the perception system 204 and the position detection system 206, as shown in FIGS. 3-6, the controller 202 processes the signals to determine a position of a raised contour 300 and an associated contour edge 302 within a target area 304. The controller 202 may process the received signals onboard the hauling machine 106 or the controller 202 may transmit the received signals to the off-board controller.

Once the position of the raised contour 300 and the associated contour edge 302 is determined accurately, the controller 202 may issue instructions to the machine control system 208 for controlling the hauling machine 106 such that the hauling machine 106 is positioned in a desired manner in the target area 304. The machine control system 208 includes means to control various sub-systems of the hauling machine 106 such as an engine, a transmission system, a braking system etc.

The machine control system 208 accordingly controls the hauling machine 106 to position the hauling machine 106 at the desired position in the target area 304. The machine control system 208 may either be a single controller or multiple controllers grouped together configured to control various sub-systems of the hauling machine 106. The machine control system 208 may be any type of a control system which may suit the need of the present application. Functioning of the control system 200 is explained in detail in FIGS. 3-6.

Figure 3:
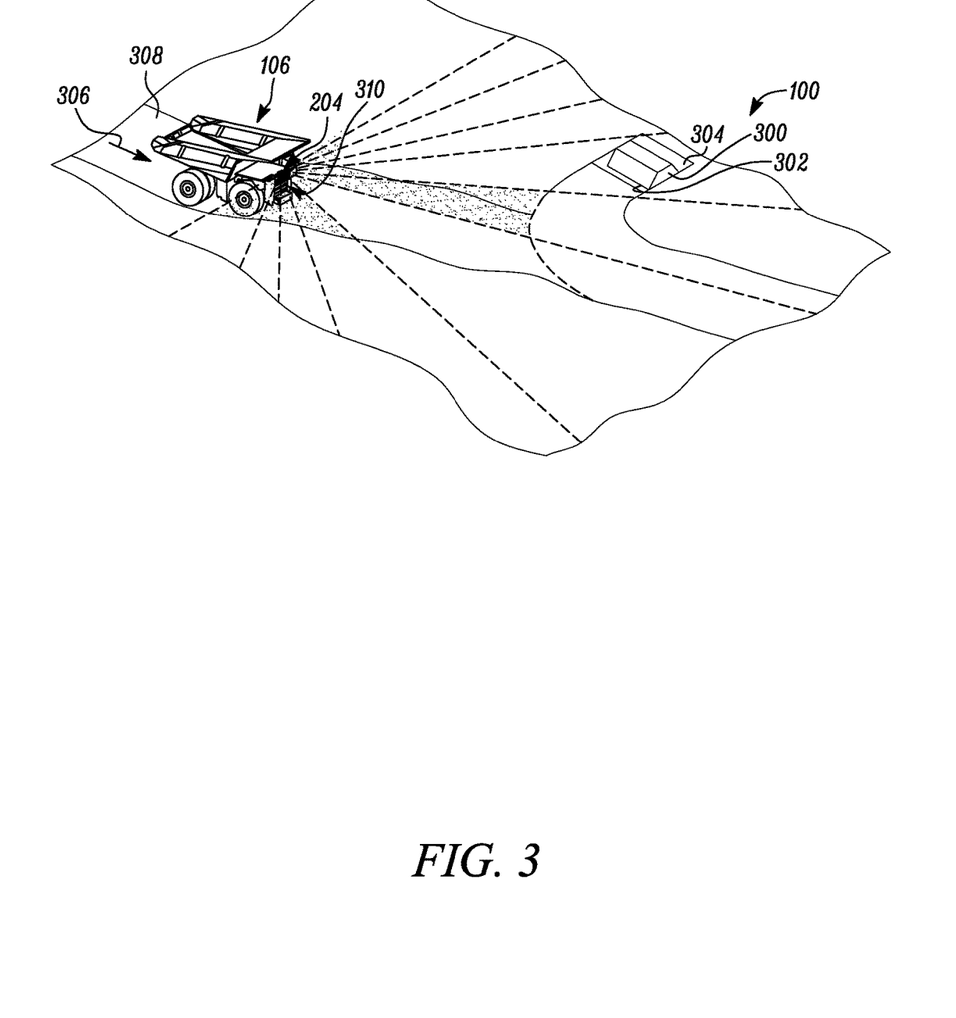
FIG. 3 is a perspective view of the machine approaching a target area on the work surface while travelling along a first direction, according to an aspect of the present disclosure.

FIG. 3 illustrates the hauling machine 106 approaching the target area 304 from a first direction 306 denoted by an arrow. The first direction 306 may not necessarily be linear. The first direction 306 may also be a curved path. The hauling machine 106 travels on a first pathway 308 to access the target area 304. The target area 304 includes the raised contour 300 at the edge of the high-wall to facilitate positioning of the hauling machine 106 for an efficient dumping operation. The raised contour 300 is shown in form of a pyramidal geometry contour having sloped walls on two sides and a flat surface on the top. The contour edge 302 is associated with the raised contour 300. The contour edge 302 is defined as a line on the work surface 100 where the slope of the raised contour 300 starts. It should be contemplated that the shape of the raised contour 300 illustrated is exemplary and the raised contour 300 may have any other geometry as well without limiting the scope of the present disclosure.

The control system 200 may have an approximate location of the target area 304 stored in the controller memory 212. As the hauling machine 106 is equipped with the position detection system 206, a distance of the hauling machine 106 from the target area 304 may be determined. The perception system 204 starts scanning the work surface 100 when the hauling machine 106 is at a pre-determined distance from the target area 304. In one embodiment, the pre-determined distance is 100 meters. The pre-determined distance may vary based on various parameters such as dimensions of the work surface 100, dimensions of the target area 304, number of dump locations 108, etc. The shaded area depicts the area scanned by the perception system 204.

Figure 4:
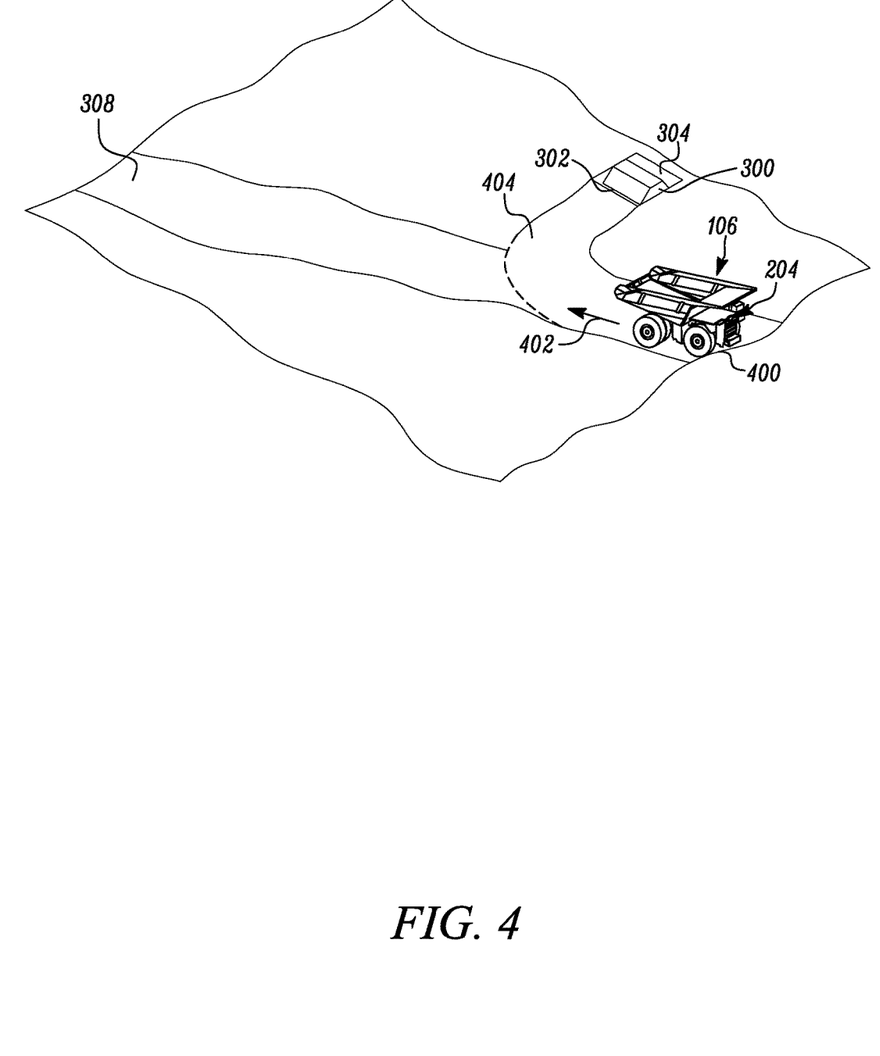
FIG. 4 is a perspective view of the machine at a virtual boundary of the work surface, according to an aspect of the present disclosure.

The perception system 204 is mounted on a front side 310 of the hauling machine 106. Therefore, the perception system 204 covers a field of view of a range of 180 degrees in front of the hauling machine 106 as illustrated. The perception system 204 travels on the first pathway 308 up to a virtual boundary 400 as shown in FIG. 4. The virtual boundary 400 may represent a cusp or an edge of the work surface 100. The virtual boundary 400 may also represent a non-accessible area for the hauling machine 106. The hauling machine 106 stops at the virtual boundary 400. The perception system 204 transmits the signals corresponding to the generated data indicative of the contour of the work surface 100 to the controller 202. Thereafter, the hauling machine 106 starts travelling in a second direction 402 denoted by an arrow on a second pathway 404 leading to the target area 304. The second direction 402 need not necessarily be a linear direction. The second direction 402 may also indicate a curved path.

The hauling machine 106 travels on the second pathway 404 by engaging a reverse gear. The perception system 204 may also stop scanning the work surface 100 when the hauling machine 106 starts travelling on the second pathway 404. The perception system 204 stops scanning the work surface 100 because of the target area 304 not being accessible to the perception system 204 as the perception system 204 is mounted on the front side 310 of the hauling machine 106 and the hauling machine 106 travels on the second pathway 404 in reverse. The controller 202 processes the data generated by the perception system 204 to determine a location of the raised contour 300 and the associated contour edge 302.

Based on the processing of the data generated by the controller 202, the perception system 204 identifies an accurate location of the raised contour 300 and the associated contour edge 302. The controller 202 identifies the location as well as position of the raised contour 300 and the associated contour edge 302 in the target area 304. The processing of the data generated by the perception system 204 and the identification of the raised contour 300 and the contour edge 302 is carried out while the hauling machine 106 is travelling in the second direction 402 on the second pathway 404 in reverse.

Figure 5:
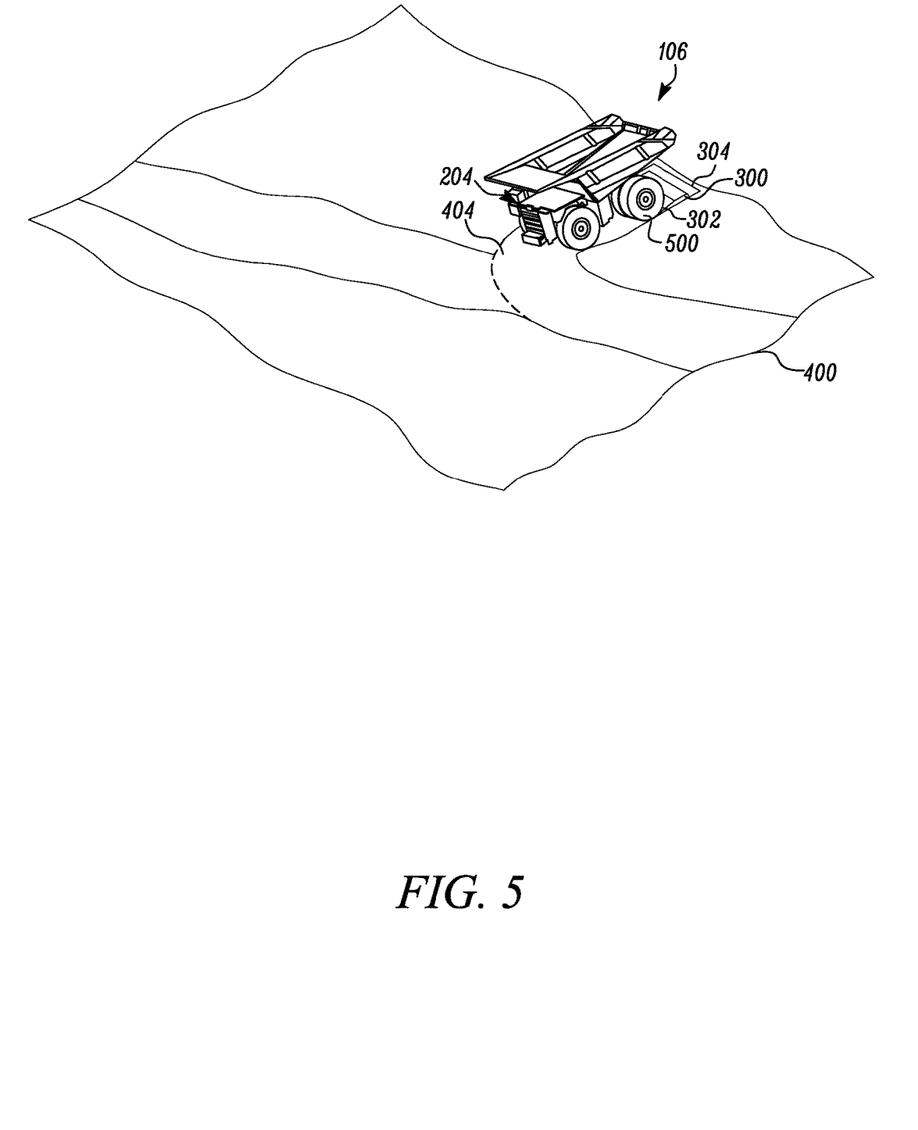
FIG. 5 is a perspective view of the machine travelling in a second direction towards the target area on the work surface, according to an aspect of the present disclosure.
Figure 6:
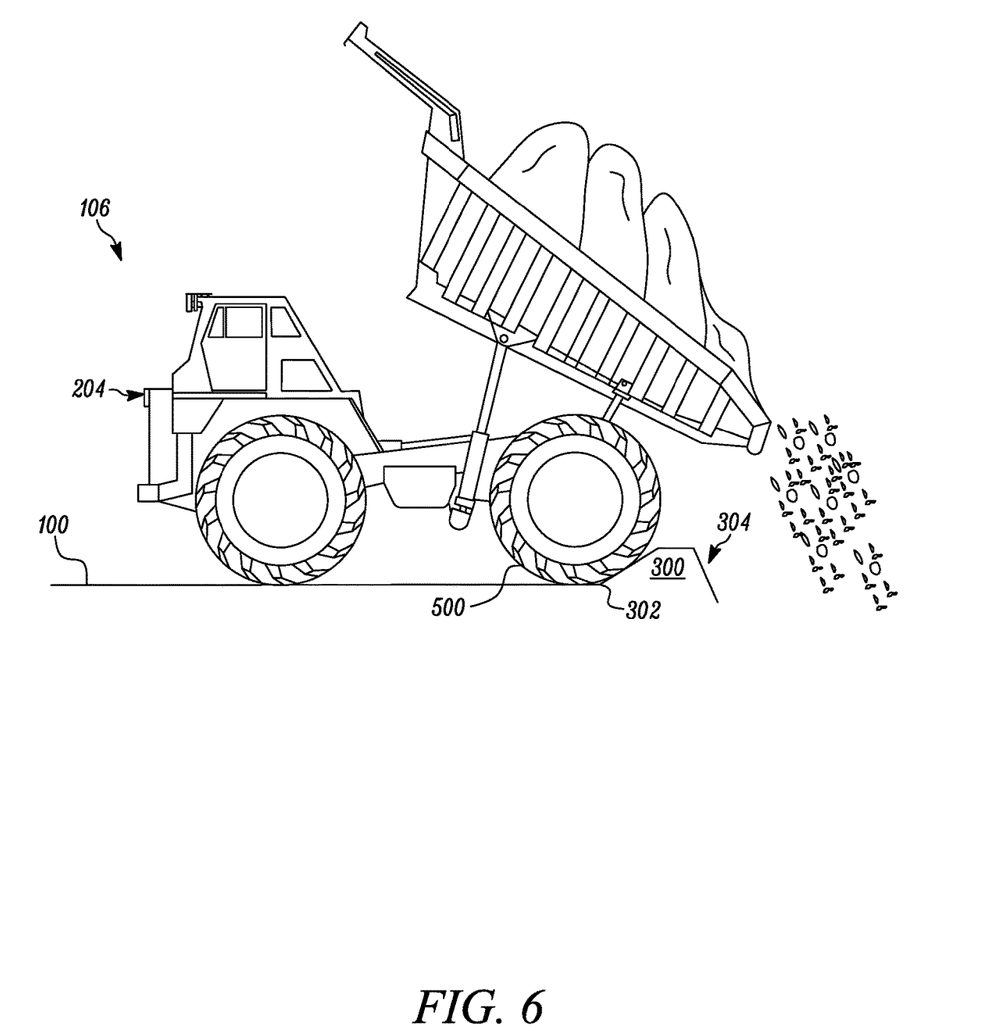
FIG. 6 is a side view of the machine positioned within the target area, according to an aspect of the present disclosure.

Referring to FIGS. 5 and 6, the controller 202 controls the hauling machine 106 through the machine control system 208 to position the hauling machine 106 in a desired position in the target area 304. The machine control system 208 halts and positions the hauling machine 106 in the target area 304 such that a portion of rear tires 500 engages the raised contour 300. Further, ground contact points of the rear tires 500 rest on the contour edge 302. The position of rear tires 500 relative to the raised contour 300 and the contour edge 302 is important for the dumping operation. The machine control system 208 controls the hauling machine 106 in a manner such that the ground contact points of the rear tires 500 coincide with the contour edge 302. As the ground contact points of the rear tires 500 rest on the contour edge 302, a portion of the rear tires 500 extends towards the raised contour 300 and engages the sloped wall of the raised contour 300. Such a position of the hauling machine 106 ensures an efficient dumping operation. After the hauling machine 106 is positioned accurately relative to the raised contour 300 in the target area 304, the hauling machine 106 discharges the material being carried over the edge of the high-wall.

In an embodiment, if the controller 202 is unable to determine the location of the raised contour 300 and the contour edge 302 by the data received from the perception system 204, the controller 202 makes use of an alternative means to determine the position of the contour edge 302 to accurately position the hauling machine 106. The controller 202 may not be able to determine the position of the contour edge 302 from the data generated by the perception system 204 because of any other machine or an obstacle coming in between the field of view of the perception system 204 and the target area 304. In such a situation, the controller 202 determines a status of the contour edge 302 as blocked. After determining the status of the contour edge 302 as blocked, the controller 202 makes use of the alternative means to identify the location of the contour edge 302. The alternative means may be one or more onboard sensors which may detect the position of the contour edge 302. The onboard sensor may be a position sensor, an imaging sensor, or any other type of a sensor which may suit the present application.

In an embodiment, the hauling machine 106 is an autonomous or semi-autonomous machine. The machine control system 208 may receive specific instructions from the controller 202 of the control system 200 to position the hauling machine 106 exactly at the specified location relative to the raised contour 300. In another embodiment, where the hauling machine 106 is manually operated by the operator, the controller 202 may issue instructions to the operator for controlling the position of the hauling machine 106 within the target area 304.

The instructions to the operator may be provided through various means. For example, audio/visual instructions may be provided through the operator interface devices 210 such as the monitor, display, microphone, etc. A more specific example may include an indication of a distance to be moved in the reverse direction to reach the contour edge 302 flashing on the display of the operator interface device 210 augmented by various audio signals helping the operator to accurately position the hauling machine 106 within the target area 304 relative to the raised contour 300.

INDUSTRIAL APPLICABILITY

Figure 7:
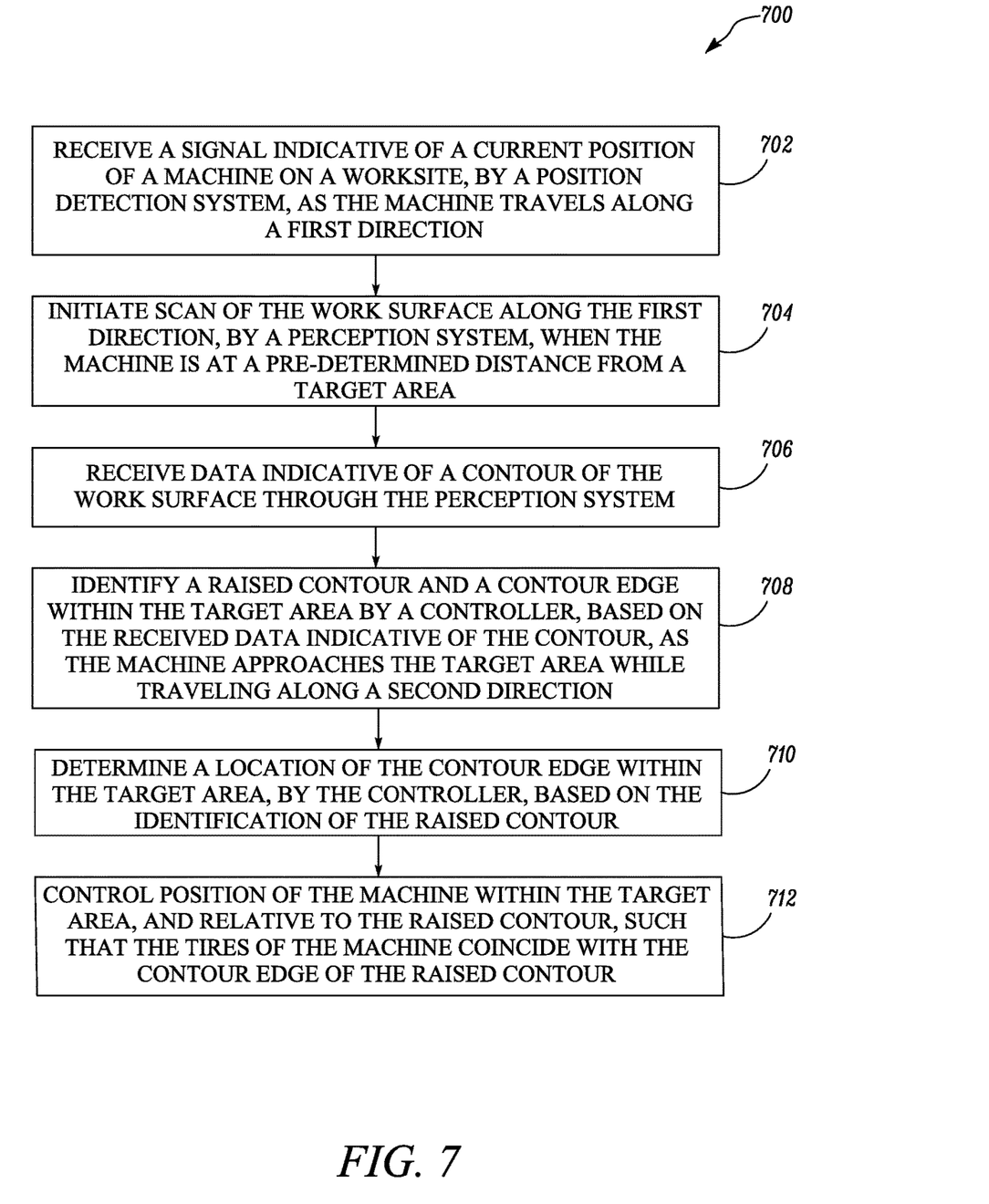
FIG. 7 is a flowchart of a method for controlling the machine operating at the work surface, according to an aspect of the present disclosure.

The present disclosure provides the control system 200 to control the position of the hauling machine 106 at the dump location 108 so as to enable the hauling machine 106 to perform the dumping operation efficiently. The present disclosure also provides a method for determining the position of the raised contour 300 and the associated contour edge 302 accurately. Referring to FIG. 7, a method 700 of controlling the hauling machine 106 is illustrated. The method 700 at block 702 includes receiving the signal indicative of the current position of the hauling machine 106 on the work surface 100 by the position detection system 206 when the hauling machine 106 travels in the first direction 306. The hauling machine 106 travels in the first direction 306 on the first pathway 308 towards the target area 304.

The method 700 at block 704 determines whether the hauling machine 106 is within the pre-determined distance from the target area 304. If the hauling machine 106 is within the pre-determined distance from the target area 304, scanning of the work surface 100 is initiated by the perception system 204 along the first direction 306. The method 700 at block 706 receives the data indicative of the contour of the work surface 100 from the perception system 204. The controller 202 may receive the data generated by the perception system 204. The method 700 at block 708 processes the received data to identify the raised contour 300 and the associated contour edge 302. The data is processed by the controller 202 as the hauling machine 106 approaches the target area 304 while travelling along the second direction 402. The controller 202 may send signals to the perception system 204 to stop scanning the work surface 100 when the hauling machine 106 starts travelling in the second direction 402 from the virtual boundary 400. The first direction 306 and the second direction 402 are two different directions. The hauling machine 106 changes a direction of travel from the first direction 306 to the second direction 402. The change in direction is made when the hauling machine 106 approaches the virtual boundary 400 while travelling on the first pathway 308 in the first direction 306.

The method 700 at block 710 determines the location of the contour edge 302 of the raised contour 300 within the target area 304 by the controller 202. The location of the contour edge 302 is determined based on the identification of the raised contour 300 and the contour edge 302 by the controller 202. The method 700 at block 712 controls the position of the hauling machine 106 within the target area 304 through the machine control system 208. The controller 202 positions and halts the hauling machine 106 relative to the raised contour 300 such that the ground contact points of the rear tires 500 of the hauling machine 106 rest on the contour edge 302. Further, a portion of the rear tires 500 engages the raised contour 300. Such a position of the hauling machine 106 at the dump location 108 ensures an efficient dumping operation. The material is effectively dumped across the edge of the high-wall and any spillage of the material being carried is avoided.

In an embodiment, if the controller 202 is unable to determine the location of the raised contour 300 and the contour edge 302 by the data received from the perception system 204, the method 700 further includes determining the status of the contour edge 302 by the controller 202 as blocked. The controller 202 may not be able to determine the position of the contour edge 302 from the data generated by the perception system 204 because of any other machine or an obstacle coming in between the field of view of the perception system 204 and the target area 304. In such a situation, the method 700 includes the controller 202 using alternative means to determine the position of the raised contour 300 and the contour edge 302 to accurately position the hauling machine 106. The alternative means may be the one or more onboard sensors which may detect the position of the contour edge 302. The onboard sensor may be the position sensor, the imaging sensor, or any other type of a sensor which may suit the present application.

As the location of the raised contour 300 and the contour edge 302 is accurately determined by the method 700 described in the present disclosure, the hauling machine 106 can be positioned without causing any distortion to the geometry of the raised contour 300. Thus, frequency of maintenance of the raised contour 300 is greatly reduced, subsequently lowering downtime and manual effort required. The method 700 of the present disclosure is equally applicable to autonomous, semi-autonomous, and manually operated hauling machines.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system comprising:
   one or more sensors; and
   a controller configured to:
      receive a signal indicative of a current position of a machine on a work surface as the machine travels along a first direction;
      initiate a scanning of the work surface, by using the one or more sensors, along the first direction when the machine is at a predetermined distance from a target area;
      receive, from the one or more sensors, data, indicative of a contour of the work surface;
      identify a raised contour and a contour edge within the target area based on the data indicative of the contour as the machine approaches the target area while traveling along a second direction,
         the second direction being different from the first direction;
      determine a location of the contour edge within the target area based on identifying the raised contour and the contour edge within the target area; and
      control a positioning of the machine, within the target area and relative to the raised contour, such that tires of the machine coincide with the contour edge.

2. The control system of claim 1, wherein the one or more sensors include at least one of a LIDAR sensor, a RADAR sensor, a SONAR sensor, or an image capturing sensor.

3. The control system of claim 1, wherein the controller is further configured to:
   halt the machine within the target area based on an engagement of the tires with the raised contour and a relative position of the tires with respect to the contour edge.

4. The control system of claim 1, wherein the controller is further configured to:
   halt the machine in a manner such that rear tires of the machine maintain a contact with the work surface at the contour edge and at least a portion of the rear tires engages a wall of the raised contour.

5. The control system of claim 1, wherein the controller is further configured to:
   stop the scanning of the work surface when the machine begins to travel in the second direction.

6. The control system of claim 1, wherein the controller is further configured to:
   change a direction of travel of the machine from the first direction to the second direction when the machine approaches a predetermined virtual boundary while travelling in the first direction.

7. The control system of claim 1, wherein the controller is further configured to:
   determine a status of the contour edge as blocked when the controller fails to identify the contour edge within the target area.

8. The control system of claim 7, wherein, when identifying the contour edge, the controller is configured to:
   identify the contour edge by using one or more other sensors mounted on the machine after the controller determines the status of the contour edge as blocked.

9. A method comprising:
receiving a signal indicative of a current position of a machine on a work surface as the machine travels along a first direction;
initiating a scanning of the work surface, by using one or more sensors, along the first direction when the machine is at a predetermined distance from a target area;
receiving, from the one or more sensors, data indicative of a contour of the work surface;
identifying a raised contour and a contour edge within the target area based on the received data indicative of the contour as the machine approaches the target area while traveling along a second direction,
the second direction being different from the first direction;
determining a location of the contour edge within the target area based on identifying the raised contour and the contour edge within the target area; and
controlling a positioning of the machine within the target area and relative to the raised contour, such that tires of the machine coincide with the contour edge.

10. The method of claim 9, further comprising:
halting the machine within the target area based on an engagement of the tires with the raised contour and a relative position of the tires with respect to the contour edge.

11. The method of claim 10, wherein the machine is halted in a manner such that rear tires of the machine maintain a contact with the work surface at the contour edge and at least a portion of the rear tires engages a wall of the raised contour.

12. The method of claim 9, further comprising:
stopping the scanning of the work surface when the machine begins to travel in the second direction.

13. The method of claim 9, comprising:
changing a direction of travel of the machine from the first direction to the second direction when the machine approaches a predetermined virtual boundary while travelling in the first direction.

14. The method of claim 9, comprising:
determining a status of the contour edge as blocked when the controller fails to identify the contour edge within the target area.

15. The method of claim 14, wherein identifying the contour edge comprises:
identifying, after determining the status of the contour edge as blocked, the contour edge by using one or more other sensors mounted on the machine.

16. A control system for a machine traveling on a work surface, the work surface including a target area having a raised contour and a contour edge, the control system comprising:

a LIDAR system mounted on the machine,
the LIDAR system being configured to generate data indicative of a contour of the work surface; and
a controller communicably coupled to the LIDAR system, the controller being configured to:
receive a signal indicative of a current position of the machine on the work surface as the machine travels along a first direction;
initiate a scanning of the work surface, by using the LIDAR system, along the first direction when the machine is at a predetermined distance from the target area;
receive, from the LIDAR system, the data indicative of the contour of the work surface;
identify the raised contour and the contour edge within the target area based on the received data indicative of the contour as the machine approaches the target area while traveling along a second direction,
the second direction being different from the first direction;
determine a location of the contour edge within the target area based on identifying the raised contour and the contour edge within the target area;
control a positioning of the machine within the target area and relative to the raised contour; and
halt the machine within the target area such that tires of the machine are engaged with the raised contour and contact points of the tires coincide with the contour edge.

17. The control system of claim 16, wherein the controller is further configured to:
stop the scanning of the work surface when the machine begins to travel in the second direction.

18. The control system of claim 16, wherein the controller is further configured to:
change a direction of travel of the machine from the first direction to the second direction when the machine approaches a predetermined virtual boundary while travelling in the first direction.

19. The control system of claim 16, wherein the controller is further configured to:
determine a status of the contour edge as blocked when the controller fails to identify the contour edge within the target area after receiving the data indicative of the contour of the work surface.

20. The control system of claim 19, wherein, when identifying the contour edge, the controller is configured to:
identify, after determining the status of the contour edge as blocked, the contour edge by using one or more sensors mounted on the machine.

* * * * *